(12) United States Patent
Olulana et al.

(10) Patent No.: US 10,179,651 B2
(45) Date of Patent: Jan. 15, 2019

(54) SEAT FASTENING DEVICE

(71) Applicant: Airbus Defence and Space GmbH, Taufkirchen (DE)

(72) Inventors: Paul Olulana, Hamburg (DE); Patrick Rollfink, Hamburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 15/456,809

(22) Filed: Mar. 13, 2017

(65) Prior Publication Data

US 2017/0259924 A1    Sep. 14, 2017

(30) Foreign Application Priority Data

Mar. 14, 2016 (EP) .................................... 16160233

(51) Int. Cl.
| | |
|---|---|
| *B64D 11/06* | (2006.01) |
| *F16C 29/00* | (2006.01) |
| *F16C 29/04* | (2006.01) |
| *B60P 7/08* | (2006.01) |
| *B60N 2/07* | (2006.01) |

(52) U.S. Cl.
CPC ........ *B64D 11/0696* (2013.01); *B64D 11/064* (2014.12); *F16C 29/005* (2013.01); *F16C 29/04* (2013.01); *B60N 2/0715* (2013.01); *B60P 7/0815* (2013.01); *F16C 2326/43* (2013.01)

(58) Field of Classification Search
CPC ............ B64D 11/0696; B64D 11/0023; B64D 9/003; B60N 2/01583; B60N 2/3011; B60N 2/305; B60N 2/366; B60N 2205/20; B60N 2/015; B60N 2/01541; F16C 29/04

USPC .... 410/105, 115, 102, 81; 296/65.05, 65.18, 296/65.13, 65.17; 297/336, 335, 378.13, 297/130, 331, 440.22
See application file for complete search history.

(56) References Cited

U.S. PATENT DOCUMENTS

| | | |
|---|---|---|
| 4,230,432 A | 10/1980 | Howell |
| 4,723,732 A | 2/1988 | Gorges |

(Continued)

FOREIGN PATENT DOCUMENTS

| | | |
|---|---|---|
| EP | 0200511 | 11/1986 |
| EP | 0215495 | 3/1987 |
| EP | 1241045 | 9/2002 |

OTHER PUBLICATIONS

European Search Report, dated Aug. 25, 2016, priority document.

*Primary Examiner* — D Glenn Dayoan
*Assistant Examiner* — Sunsurraye Westbrook
(74) *Attorney, Agent, or Firm* — Greer, Burns & Crain, Ltd.

(57) ABSTRACT

To provide a simple seat fastening device with enhanced flexibility and the possibility of an easy movement of vehicle seats, a seat fastening device for fastening vehicle seats in a vehicle is provided comprising a seat track and a slider in a sliding engagement with the seat track. The slider includes a seat fixation element to fix a foot of a vehicle seat, wherein the seat track includes a C-shaped profile and the slider includes a base inserted in the C-shaped profile and wherein the slider includes a clamp to clamp the slider against an inner surface of the C-shaped profile. At least one linear roller contact bearing is located between the C-shaped profile and the slider.

16 Claims, 1 Drawing Sheet

(56) References Cited

U.S. PATENT DOCUMENTS

| | | | | |
|---|---|---|---|---|
| 4,776,533 A | * | 10/1988 | Sheek | B64D 11/0696 |
| | | | | 244/118.6 |
| 5,083,726 A | * | 1/1992 | Schurr | B64D 11/0696 |
| | | | | 244/118.6 |
| 5,449,132 A | * | 9/1995 | Gilbert | B64D 11/0696 |
| | | | | 244/122 R |
| 5,899,428 A | | 5/1999 | Gauger | |
| 5,921,606 A | * | 7/1999 | Moradell | B60N 2/01541 |
| | | | | 248/429 |
| 6,189,852 B1 | | 2/2001 | Hopley et al. | |
| 7,207,756 B2 | * | 4/2007 | Vichniakov | B23K 20/00 |
| | | | | 410/115 |
| 8,517,310 B2 | * | 8/2013 | Marechal | B60N 2/01516 |
| | | | | 244/118.6 |
| 8,845,249 B2 | * | 9/2014 | Rowles | B60P 7/0815 |
| | | | | 410/105 |
| 2002/0130238 A1 | | 9/2002 | Downey | |
| 2015/0053838 A1 | | 2/2015 | Mazidi et al. | |
| 2015/0321582 A1 | | 11/2015 | Sasaki et al. | |

\* cited by examiner

SEAT FASTENING DEVICE

CROSS-REFERENCES TO RELATED APPLICATIONS

This application claims the benefit of the European patent application No. 16160233.9 filed on Mar. 14, 2016, the entire disclosures of which are incorporated herein by way of reference.

BACKGROUND OF THE INVENTION

The invention relates to a seat fastening device for fastening vehicle seats in a vehicle, especially in an aircraft, comprising a seat track and a slider which is in a sliding engagement with the seat track wherein the slider includes a seat fixation means for fixing a vehicle seat.

EP 0 215 495 A2 discloses a movable seating system for an aircraft wherein an adjustable seating system is particularly adapted for use in a passenger aircraft. In the passenger aircraft, a pair of seat tracks are mounted in the floor of the aircraft, and a plurality of seating units are mounted to these tracks. The seat tracks have a C-shaped portion, and a slider is inserted in a canal of this C-shaped portion and is clamped therein.

EP 0 200 511 A1 discloses an anchor fitting for securing loads to a retainer track wherein the track has a C-shaped profile portion, and part of a slider is inserted in a canal of this C-shaped profile portion. Further, a clamping means is provided to clamp the slider on a predetermined position.

Further, track fastenings for use of locking seats in a vehicle, such as an aircraft, are disclosed in U.S. Pat. No. 4,230,432 A.

The current seat tracks and seat fittings in an aircraft cabin are efficient for fixation of seats, but they have a quite complex design, are not very flexible and do not provide the possibility of an easily moving the seats from one position to another in a short period of time.

SUMMARY OF THE INVENTION

A problem to be solved by the invention is to provide a simple seat fastening device that is flexible in use and allows a fast reconfiguration of a seat arrangement within a vehicle.

According to a first aspect, the invention provides a seat fastening device for fastening vehicle seats in a vehicle, comprising a seat track and a slider in a sliding engagement with the seat track, the slider including a seat fixation means for fixing a vehicle seat, wherein the seat track includes a C-shaped profile and the slider includes a base inserted in the C-shaped profile and wherein the slider includes a clamp means for clamping the slider against an inner surface of the C-shaped profile characterized by at least one linear roller contact bearing between the C-shaped profile and the slider.

It is preferred that the roller contact bearing includes at least one first ball race formed on at least one of the side surfaces of the slider which side surfaces face inner surfaces of side legs of the C-shaped profile.

It is preferred that the roller contact bearing includes at least one second ball race formed on at least one of the inner surfaces of the side legs of the C-shaped profile.

It is preferred that the first ball race includes a groove extending in a longitudinal direction with regard to the seat track.

It is preferred that the second ball race includes a rib projection extending along the longitudinal direction of the seat track and that balls are running on an upper surface of the rib projection.

It is preferred that the clamping means includes a screw pin and the slider includes a vertical threaded through opening extending in a vertical direction through the slider for receiving the screw pin.

It is preferred that the screw pin is a key pin with a key tool engagement means for engagement with a key tool in order to rotate the screw pin in the threaded opening.

It is preferred that the seat fixation projects through a slot opening of the C-shaped profile.

It is preferred that the threaded through opening is aligned with the slot opening so that the screw pin can be accessed through the slot opening or passes through the slot opening.

According to a further aspect, the invention provides a vehicle seat arrangement, comprising at least one vehicle seat and a seat fastening device according to any of the above mentioned embodiments for fastening the vehicle seat in a vehicle.

According to a further aspect, the invention provides a vehicle cabin, especially an aircraft cabin, comprising a plurality of seat fastening devices according to any of the above mentioned embodiments.

According to a further aspect, the invention provides a method for locking an aircraft seat in seat tracks provided in an aircraft cabin, characterized by using seat fastening devices according to any of the above mentioned embodiments, and comprising the steps of:

sliding the sliders having the seat fixation fixed to feet of the seat to a predetermined position and clamping the sliders with the clamping means in order to lock the sliders in the predetermined position.

A preferred embodiment of the invention provides an integrated linear motion fastening apparatus for positioning, sliding, and fastening of aircraft seats. A preferred embodiment of this invention is developed as a solution to the technical problem of the lack of seating configuration flexibility in the aircraft cabin.

Preferred embodiments of the invention provide flexibility and allow a fast reconfiguration of a seat arrangement in a vehicle, such as in an aircraft cabin.

Preferred embodiments of the technical solution allow more seating configuration flexibility.

Preferred embodiments of the invention allow a rapid reconfiguration.

Preferred embodiments allow an easier fixation of seats to an aircraft frame.

Preferred embodiments provide a very light-weight solution for flexible seat fittings.

Advantageous embodiments of the invention provide an integrated linear motion seat fastening device and/or a method for locking aircraft seats into a locking seat track with the technical possibility of rapidly unlocking from the seat track, sliding the entire seat to a new position from current position, and finally locking the seat into the track at the desired position.

A preferred integrated equipment comprises a personalized lock-pin (such as a pin with a personalized key tool engagement to be engaged by a personalized tool), an integrated linear motion seat fastening and an integrated linear motion seat track.

An advantageous embodiment of the invention involves an adaptive design of the seat track to include a sliding component which enables the integrated linear motion seat fastening to be able to provide sliding possibilities via rolling contact bearings, such as all bearings, in a canal of a seat track.

The seat is connected to the fastening device at a seat fixation means, and the positioning and fixing of the integrated device is achievable through the personalized lock-pin inserted at a respective pin receiving means and reliably fastening the seat to the seat track at appointed positions wherein the pin is bored into the seat track on the underlying horizontal surface.

BRIEF DESCRIPTION OF THE DRAWINGS

Further details of the invention become more clear from the following description of a preferred embodiment of the invention with reference to the accompanying drawings, wherein.

DETAILED DESCRIPTION OF THE PREFERRED EMBODIMENTS

Figure 1:
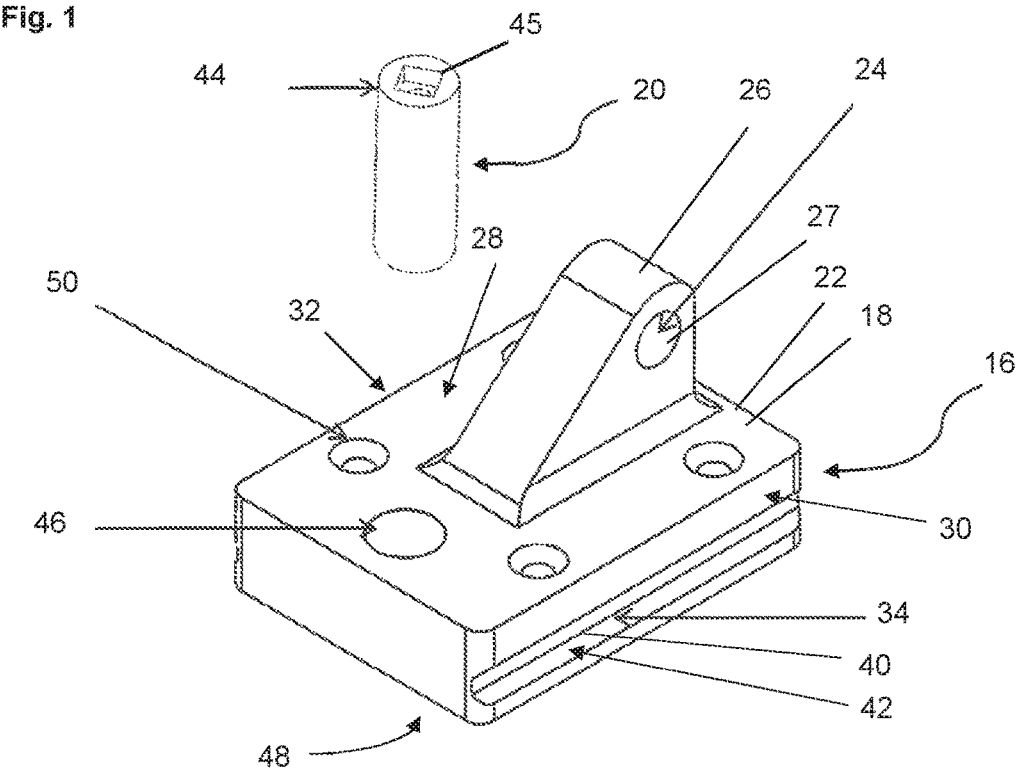
FIG. 1 shows an exploded perspective view of a slider including a clamping means.
Figure 2:
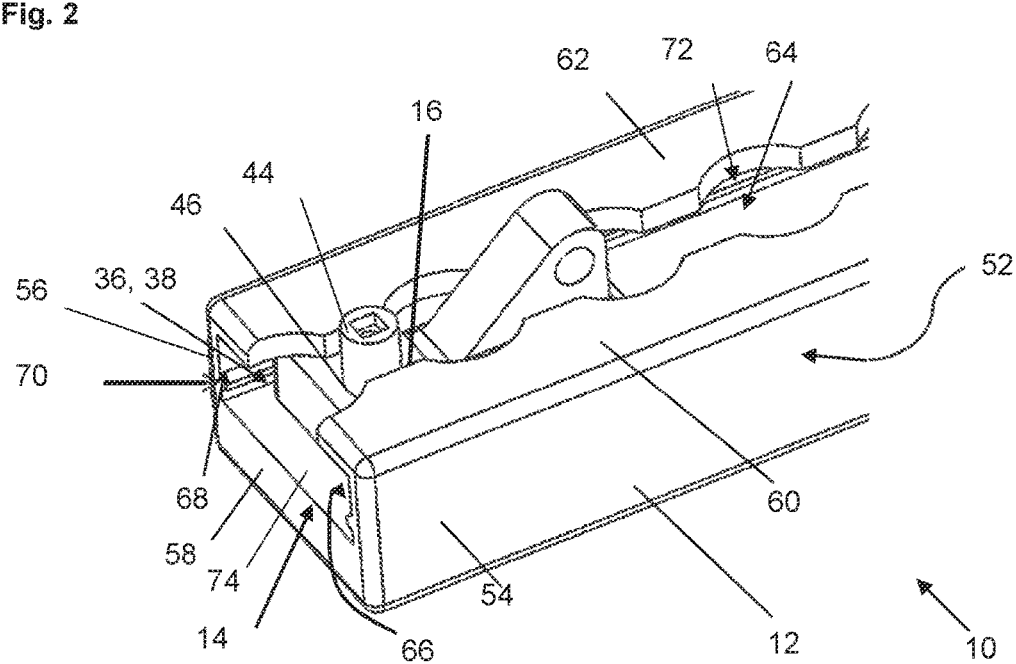
FIG. 2 shows a perspective view of a preferred embodiment of a seat fastening device wherein the slider of FIG. 1 is inserted in a canal of a C-shaped profile of a seat track.

FIGS. 1 and 2 show a seat fastening device 10 comprising a seat track 12 with a canal 14 and a slider 16 that is received in the canal 14 in order to be moved in a linear motion longitudinally to the seat track 12. Further, the seat fastening device 10 comprises a clamping means 20 for locking the slider 16 at any desired position along the seat track 12.

FIG. 1 shows an exploded perspective view of the slider 16 together with the clamping means 20.

The slider 16 includes a base 18 with a base body 22 which has essentially the form of a cuboid and a seat fixation means 24 for fixing or connecting a foot of an aircraft seat (not shown) to the slider 16.

The seat fixation means 24 includes a projection 26 on an upper surface 28 of the base body 22. The projection 26 includes a vertical through bore 27 extending from one side surface of the projection 26 to the other side surface of the projection 26 and which is adapted to receive a fixing element such as a screw or the like (not shown) for connecting the seat foot to the projection.

On a first and a second side surface 30, 32, the base body 22 has first ball races 34 for receiving rolling elements of rolling contact bearings 36. As indicated in FIG. 2, the slider 16 is borne within the canal 14 of the seat track 12 via the rolling contact bearings 36. The rolling contact bearings 36 are especially formed as ball bearings 38.

The first ball races 34 are especially formed as V-shaped or U-shaped grooves 40 with inclined groove walls 42.

The clamping means 20 includes a clamping element in form of a balled or threaded pin 44. An outer periphery of the pin 44 is provided with a screw thread. On a free end, the pin 44 has a key tool engagement means 45 configured to be engaged by a personalized key tool (not shown) in order to rotate the pin 44.

The base 18 has a through opening 46 extending from the upper surface 28 of the base body 22 to a lower surface 48 thereof. An inner surface of the opening 46 is provided with a screw thread for engagement with the thread of the pin 44.

Further, the upper surface 28 has recesses 50 for receiving friction elements made from an elastic material (not shown).

Referring to FIG. 2, the seat track 12 has a C-shaped profile (which can be a profile portion of a larger seat track arrangement—not shown). The C-shaped profile 52 includes a first and a second leg 54, 56 and a web 58 therebetween. At the upper ends of the legs 54, 56, there are flanges 60, 62 directed to each other so that a slot opening 64 extending along the seat track 12 is formed therebetween.

Hence, the canal 14 is defined by the legs 54, the web 58 and the flanges 60, 62. With the slider 16 inserted in the canal 14, the projection 26 reaches through the slot opening 64. Further, the key engagement means 45 of the pin 44 can either be accessed through the slot opening 64, or the pin 44 reaches through the slot opening 64 so that the key tool engagement means 45 can be freely accessed.

The first and second side surface 30, 32 face respective inner surfaces 66, 68 of the first and second legs 54, 56.

Each of the first and second inner surfaces 66, 68 has a second ball race 70 of the ball bearings 38. As visible from FIG. 2, the second ball race 70 includes a rib-formed projection or any other form which provides an inclined upper ball support surface 72 which supports the balls (not shown) of the ball bearings 38.

Hence, each foot of the seat is fastened by at least one of the seat fastening devices 10 in such way that a lower surface of the pin 44 presses against a lower horizontal surface of the canal 44 which is formed by an inner surface 74 of the web 58. This clamping force urges the upper surface 28 of the slider 16 against the inner surfaces of the flanges 60, 62.

For changing the seat configuration, the clamping means is disengaged by a screw motion of the pin 44 using the personalized key tool. With the clamping means 20 disengaged, the slider can be easily moved along the seat track 12 via the ball bearings 38. When a desired position is reached, the seat is locked by screwing the pin 44 into the opening and pressing the lower surface of the pin 44 against the inner surface 74 of the web.

The embodiment as shown has been developed by a breakdown of different functions of the aircraft seats and their fixation to the frame of an aircraft. Sub-functions have been identified and separate function elements have been developed for each function and sub-function. Thus, an integrated design of the developed function elements could be achieved to construct the embodiment as shown.

The described embodiment provides a flexible and easy reconfiguration of aircraft seats.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 seat fastening device
12 seat track
14 canal
16 slider
18 base
20 clamping means
22 base body
24 seat fixation means
26 projection 27 vertical through bore
28 upper surface
30 first side surface
32 second side surface
34 first ball race
36 rolling contact bearing
38 ball bearing
40 groove
42 inclined groove wall
44 pin
45 key tool engagement means
46 through opening
48 lower surface
50 recess
52 C-shaped profile
54 first leg
56 second leg
58 web
60 first flange
62 second flange
64 slot opening
66 first inner surface
68 second inner surface
70 second ball race
72 upper ball support surface
74 inner surface of the web

The invention claimed is:

1. A seat fastening device for fastening vehicle seats in a vehicle, comprising:
    a seat track and
    a slider in a sliding engagement with the seat track,
        the slider including a seat fixation element configured to fix a vehicle seat,
        the seat track including a C-shaped profile,
        the slider including a base inserted in the C-shaped profile, and
        the slider including a clamp configured to clamp the slider against an inner surface of the C-shaped profile, and
    at least one linear roller contact bearing comprising a ball race configured to receive a ball bearing between the C-shaped profile and the slider.

2. The seat fastening device according to claim 1, wherein the ball race of the least one linear roller contact bearing comprises at least one of:
    at least one first ball race formed on at least one of the side surfaces of the slider which side surfaces face inner surfaces of side legs of the C-shaped profile, or
    at least one second ball race formed on at least one of the inner surfaces of the side legs of the C-shaped profile.

3. The seat fastening according to claim 1, wherein the ball race includes a groove extending in a longitudinal direction with regard to the seat track.

4. The seat fastening according to claim 2, wherein the at least one second ball race includes a rib projection extending along the longitudinal direction of the seat track and wherein balls run on an upper surface of the rib projection.

5. The seat fastening device according to claim 1, wherein the clamp includes a screw pin and the slider includes a vertical threaded through opening extending in a vertical direction through the slider for receiving the screw pin.

6. The seat fastening device according to claim 5, wherein the screw pin is a key pin with a key tool engagement configuration to engage with a key tool to rotate the screw pin in the threaded opening.

7. The seat fastening device according to claim 1, wherein the seat fixation element projects through a slot opening of the C-shaped profile.

8. The seat fastening device according to claim 5, wherein the seat fixation element projects through a slot opening of the C-shaped profile and wherein the threaded through opening is aligned with the slot opening so that the screw pin can be accessed through the slot opening or passes through the slot opening.

9. A vehicle seat arrangement, comprising at least one vehicle seat and a seat fastening device according to claim 1 for fastening the seat in a vehicle.

10. A vehicle cabin comprising a plurality of seat fastening devices according to claim 1.

11. A vehicle cabin according to claim 10 comprising an aircraft cabin.

12. A method for locking an aircraft seat in seat tracks provided in an aircraft cabin, using seat fastening devices according to claim 1, and comprising the steps:
    sliding the sliders with the seat fixation element fixed to feet of the seat to a predetermined position, and
    clamping the sliders with the clamp.

13. A seat fastening device for fastening vehicle seats in a vehicle, the seat fastening device comprising:
    a seat track comprising a first leg, a second leg, a first flange, and a second flange, the first leg and second leg being connected by a web, the first flange connected to the first web and the second flange connected to the second leg, the first flange and the second flange extending toward each other and being separated by a slot, and wherein the first leg, the second leg, the first flange, the second flange, and the web define a canal;
    a slider received in the canal, the slider including a seat fixation element configured to fix a vehicle seat, a base within the canal, and a clamp configured to clamp the slider against an inner surface of at least one of the first flange and the second flange; and,
    at least one ball race configured to receive a ball bearing between the seat track and the slider.

14. The seat fastening device of claim 13 wherein the clamp comprises a pin.

15. The seat fastening device of claim 14 wherein the pin is configured to press against an inner surface of the web.

16. A seat fastening device for fastening vehicle seats in a vehicle, the seat fastening device comprising:
    a seat track comprising a first leg, a second leg, a first flange, and a second flange, the first leg and second leg being connected by a web, the first flange connected to the first web and the second flange connected to the second leg, the first flange and the second flange extending toward each other and being separated by a slot, and wherein the first leg, the second leg, the first flange, the second flange, and the web define a canal;
    a slider received in the canal, the slider including a seat fixation element configured to fix a vehicle seat, a base within the canal, and a clamp configured to clamp the slider against an inner surface of at least one of the first flange and the second flange, and a pin configured to press against an inner surface of the web; and,
    at least one ball race configured to receive a ball bearing between the seat track and the slider.

* * * * *